United States Patent [19]

Smith et al.

[11] Patent Number: 5,747,395
[45] Date of Patent: May 5, 1998

[54] COBALT GLASS COMPOSITIONS FOR COATINGS

[75] Inventors: Peter John Smith; Harbans Kaur Mangat, both of Kidlington, United Kingdom

[73] Assignee: Cookson Matthey Ceramics & Materials Limited, London, United Kingdom

[21] Appl. No.: 619,558
[22] PCT Filed: Sep. 28, 1994
[86] PCT No.: PCT/GB94/02105
  § 371 Date: May 8, 1996
  § 102(e) Date: May 8, 1996
[87] PCT Pub. No.: WO95/09131
  PCT Pub. Date: Apr. 6, 1995

[30] Foreign Application Priority Data

Sep. 28, 1993 [GB] United Kingdom ............... 9319971

[51] Int. Cl.$^6$ .................. C03C 10/04; C03C 8/04
[52] U.S. Cl. .................. 501/5; 501/20; 501/26; 501/32; 501/65; 501/67; 428/428; 428/701
[58] Field of Search .................. 501/5, 20, 26, 501/32, 65, 67; 428/428, 701

[56] References Cited

U.S. PATENT DOCUMENTS

| | | | |
|---|---|---|---|
| 4,361,654 | 11/1982 | Ohmura et al. | 501/21 |
| 4,446,241 | 5/1984 | Francel et al. | 501/14 |
| 4,536,329 | 8/1985 | Hormadaly | 501/20 |
| 4,537,862 | 8/1985 | Francel et al. | 501/14 |
| 4,554,258 | 11/1985 | Francel | 501/21 |
| 4,892,847 | 1/1990 | Reinherz | 501/14 |
| 5,200,369 | 4/1993 | Clifford et al. | 501/66 |
| 5,244,848 | 9/1993 | Clifford et al. | 501/66 |
| 5,308,803 | 5/1994 | Clifford et al. | 501/17 |
| 5,439,852 | 8/1995 | Hormadaly | 501/26 |

FOREIGN PATENT DOCUMENTS

| | | |
|---|---|---|
| 001755 | 5/1979 | European Pat. Off. . |
| 049041 | 4/1982 | European Pat. Off. . |
| 358933 | 3/1990 | European Pat. Off. . |
| 425927 | 5/1991 | European Pat. Off. . |
| 1187834 | 4/1970 | United Kingdom . |

OTHER PUBLICATIONS

Derwent Database WPI, week 8211, Class L, AN 82-21842E of SU-A-833617, May 1981.
Chem. Abstracts, vol. 96, No. 8, Feb. 1982, 56819y of JP-A-56109840, Aug. 1981.
Derwent Database WPI, week 9022, Class L, AN 90-170643 of SU-A-1525123, Nov. 1989.
Chem. Abstracts, vol. 110, No. 20, May 1989, 178391f of PL-A-141766, Jun. 1988.

*Primary Examiner*—Mark L. Bell
*Assistant Examiner*—Louis M. Troilo
*Attorney, Agent, or Firm*—Watson Cole Stevens Davis, P.L.L.C.

[57] ABSTRACT

A glass composition which is essentially free of lead and cadmium includes 30 to 70 wt % $SiO_2$, 1 to 25 wt % $B_2O_3$, 0 to 10 wt % $Al_2O_3$, 0 to 5 wt % $Bi_2O_3$, 0.1 to 30 wt % CoO, 0.1 to 20 wt % ZnO, 1 to 30 wt % total of at least one of $Li_2O$, $Na_2O$ or $K_2O$, up to 10 wt % $ZrO_2$ and other optional ingredients. The glass composition can be used as a blue colored on-glaze enamel which relies upon the presence of $Co^{2+}$ in a network-forming position in the glass to produce the blue color, with oxygen donors such as $ZnO_2$, alkaline earth oxides and alkali oxides increasing the amount of cobalt occupying network-forming positions, and $ZrO_2$ to provide chemical durability.

9 Claims, No Drawings

COBALT GLASS COMPOSITIONS FOR COATINGS

BACKGROUND OF THE INVENTION

FIELD OF THE INVENTION

The present invention relates to glass compositions and, in particular, to glass compositions which are of minimal toxicity and are substantially free of lead and cadmium and which can be used either as blue coloured glasses for mixing with pigments to provide other colour compositions for the decoration of ceramic materials and/or glass, or as pigments per se.

Occasional episodes of lead poisoning have resulted from the use of improperly formulated and fired lead-containing glazes and/or decoration enamels on ceramic ware. Whilst lead-containing glazes and decoration enamels can be prepared which are safe and meet current requirements for permissible lead release to food with which they come into contact, the problem of lead poisoning is avoided if lead itself is avoided. In addition, various pollution controls regarding the use of lead and limits on the content of lead in waste water can be avoided by the use of lead-free glazes and decoration enamels.

Consequently, glaze and enamel decorating suppliers have strived to provide lead-free products which meet the necessary technical requirements, particularly the more exacting demands on durability. However, the development of a durable and intense royal blue colour has proved to be an exception. In the past, royal blue on-glaze enamels were generally produced using high-leaded, transparent glassy fluxes and pigments based on the crystalline $CoO$—$ZnO$—$SiO_2$ system. For the new lead-free colours, transparent lead-free borosilicate fluxes have been used in place of the leaded versions. However, as the $CoO$—$ZnO$—$SiO_2$ phase is soluble in mild acid, replacement of leaded fluxes with lead-free equivalents does not fully address the durability problem. Moreover, the standard practice of increasing colour intensity by increasing the pigment loading serves only to degrade the chemical resistance still further. Thus, the conventional pigmented flux approach is incapable of producing a durable and intense blue enamel without recourse to elaborate coating techniques for the pigment. Hence, an alternative method of producing a durable intense blue enamel for tableware decoration is required. The use of a durable lead-free intense blue glass in place of a conventional pigmented flux is herein disclosed.

SUMMARY OF THE INVENTION

Various attempts have been made to produce blue glasses for enamel decoration of jewellery, glassware and tableware. However, the widespread use of on-glaze blue glass enamels for tableware has been limited by shortcomings in certain key areas.

In addition to being lead-free and cadmium-free, a coloured glass to be used for on-glaze enamel decoration must simultaneously satisfy a number of key requirements. Firstly, the softening point of the glass should be such as to allow maturation within the temperature range of from 750° to 900° C., which are typical on-glaze enamelling temperatures for decoration on bone china, earthenware, hotelware or porcelain pieces.

Secondly, the coloured glass should be compatible with a wide variety of glazes.

Thirdly the coloured glass should display good resistance to pronounced opacity or mattness during a conventional enamel firing schedule in order to promote good colour development with a glossy finish.

Fourthly, the linear coefficient of thermal expansion (CTE) of the coloured glass should be compatible, or made compatible through additions of filler materials, with that of the glaze coated thereon to prevent crazing and/or spalling.

Finally, the durability of the coloured glass should be such as to enable the fired colours to withstand attack by acidic foodstuffs and alkali detergents. With controls on permissable levels of metal release into acidic and alkali solutions becoming more stringent, more exacting demands are being placed on the durability requirements of decorated pieces.

In the light of the present invention, it is important to stress that it is the durability of the final product, i.e. fired colour, which is of concern, not that of the glassy frit which may change in use.

We have now developed a glass composition which can be used as a blue coloured on-glaze enamel which simultaneously meets, or at least substantially meets, the aforementioned key requirements. It relies upon the presence of $Co^{2+}$ in a network-forming position in the glass to produce the blue colour, with oxygen donors such as $ZnO_2$, alkaline earth oxides and alkali oxides increasing the amount of cobalt occupying network-forming positions, and $ZrO_2$ to provide chemical durability.

Accordingly the present invention provides a crystallizing glass composition which is essentially free from lead and cadmium and which comprises the following components:

| | Weight Percent | |
|---|---|---|
| $SiO_2$ | 30–70 | |
| $B_2O_3$ | 1–25 | |
| $Al_2O_3$ | 0–10 | |
| $Bi_2O_3$ | 0–50 | |
| $CoO$ | 5–15 | |
| At least one of | | |
| $Li_2O$ | 0–10 | |
| $Na_2O$ | 0–20 | 1–30 (in total) |
| $K_2O$ | 0–20 | |
| Optionally one or more of MgO, CaO, SrO or BaO | 0–15 | |
| ZnO | 5–15 | |
| $ZrO_2$ | up to 10 | |
| $TiO_2$ | 0–1 | |
| optionally one or more of $SnO_2$, $WO_3$, $MoO_3$ or $Nb_2O_5$ | 0–5 | |
| optionally one or more of $Y_2O_3$, $La_2O_3$ or $CeO_2$ | 0–5 | |
| $P_2O_5$ | 0–5 | |

The glass or the present invention relies on the presence of $Co^{2+}$ in the glass network to provide a blue colour.

In the glasses or the present invention the intensity of the blue colour of the glass is increased by altering the glass chemistry to promote precipitation of the $(Co,Zn)_2SiO_4$ (phenacite) phase either during enamel firing or by a prior thermal treatment of the glass. Optionally a nucleating agent such as $ZrO_2$, $P_2O_5$ or other agents known to those skilled in the art of glass ceramics may be employed to assist in the $(Co,Zn)_2SiO_4$ precipitation.

Preferred crystallizing glass compositions of the present invention are detailed below:

|  | Preferred Range wt % | More Preferred Range wt % |
|---|---|---|
| $SiO_2$ | 35–60 | 35–55 |
| $B_2O_3$ | 1–20 | 2–10 |
| $Al_2O_3$ | 1–10 | 2–6 |
| CoO | 5–15 | 5–12 |
| $R_2O$ | 1–20 | 2–15 |
| ZnO | 5–15 | 7–12 |
| $ZrO_2$ | 1–7 | 2–5 |
| $R_2O_3 + ZrO_2$ | 1–25 | 2–20 |

For glasses, with CTE's below $7.0 \times 10^{-6}/°C$., the presence of $Bi_2O_3$ is generally required in order to provide a glossy fired appearance. The preferred range is 5–25 wt %., the more preferred range is 3–15 wt %.

The composition of the present invention contains $ZrO_2$ in order to improve the resistance of the compositions to attack by alkali detergent solutions.

The glasses of the invention can be prepared from natural (benificated) rocks and minerals, e.g., limestone, silica sand, etc., as well as "fine chemicals".

The various minerals and/or oxides used in the preparation of the compositions of the present invention are usually in the form of fine powders. Precursors of these oxides can also be useful, providing that they decompose to form the required oxides at temperatures below the melting temperature of the glass. Suitable "fine chemical" precursors are the nitrites, nitrates, carbonates, metal organic salts, for example citrates, acetates, etc.

The glass of the present invention may be prepared by mixing together materials, charging the mixture of materials to a glass melting furnace at a temperature sufficiently high to produce the fluxed glass and then fritting the glass by pouring it into water, or by passing it through water cooled rolls. It may be preferred to carry out the melting and fritting operation in an oxidising atmosphere, or to include a oxygen rich component in the mixture which is melted and fused. The frit may be ground into a powder by conventional grinding techniques.

The glasses of the present invention are preferably fluxes which are used in combination with one or more pigments as a colour on ceramic substrates or glass.

It will be understood by those skilled in the art that for use as an enamel on tableware, the glass compositions must mature or yield a smooth continuous surface at temperatures below the melting temperatures of the glazes on the ceramic articles on which they are to be used. Generally, the glass compositions will melt at a temperature of below 1350° C., preferably at a temperature in the range of from 1150° C. to 1300° C.

The present invention thus includes within its scope a composition for the decoration of ceramic substrates and/or glasses which comprise a blue glass frit as hereinbefore described on its own or in admixture with one or more pigments, or other colourants, or filler material such as fused silica, β-spodumene or β-eucryptite. The composition for the decoration of ceramic materials and/or glass may additionally contain a plastic binder therein.

The glasses of the present invention may be made into decoration printing inks or pastes and applied to ceramic or glass substrates using standard decoration methods. These include silk-screen printing, pad printing, or by application of decalomania transfers (decals) to the substrates. To make the printing inks or pastes, a dry powder of the glass is dispersed in an oil-, water-, solvent- or wax-based medium with the aid of shear mixers and triple roll mills. For silk-screen printing, oil-based media are generally used, whilst for pad printing, wax-based inks are more commonly used because of their thermoplastic nature.

In silk-screen printing, the ink or paste is applied to the substrate by using a sharply-edged rubber squeegee to press the ink through the open areas of a fine mesh stretched on a frame. The mesh is generally no longer made of silk but is more commonly made of either metal or polyester. The substrate is positioned below the screen and as the two contact, the ink adheres in a precise pattern relating to the open area of the design of the screen. Precise control over the thickness of the ink or paste is achieved through adjustment of the ink or paste rheology, the diameter of the mesh filament or pores, the distance of the screen from the substrate and the pressure on the squeegee.

Pad printing involves transferring an ink design from a metal or plastic engraved cliche (plate) or from a screen printed image (an image deposited on to a flat silicone plate), to a substrate by means, for example, of a pliable silicone pad. For application using a cliche, depending on the machine type the first step in the process involves pouring the ink into or directly on to the etched plate. The cliche is flooded with ink and then cleaned off with a doctor blade, leaving the ink only in the etched impression of the image. Using appropriate pressures and cycle times, the pad is pressed on to the etched portion of the plate, where it picks up the ink. The pad then rises up and travels laterally towards the substrate. It is lowered (with appropriate pressure and cycle time) on to the substrate to deposit the image. Pad printing has the advantage over silk-screen printing of enabling printing on curved and discontinuous surfaces, but traditionally is less suited for printing large surface areas.

For application using decalomania transfers (decals), the decoration or design containing the glass enamel, is formed independent of the surface to be decorated, usually on a transfer paper or other carrier. Subsequently, as and when required, the decal is transferred on to the substrate surface.

For all printing methods, the organic components of the printing inks or pastes either evaporate or burn away during thermal fusion of the decoration to the substrate during the firing cycle.

The glasses of the present invention are compatible both with conventional glazes on ceramic materials and with the bismuth based glazes which are described in our European Patent Application No. 91303072.2.

The glasses of the present invention give good colour development, i.e., the fired colour is bright and "wet".

They can be made suitable for either bone china, fine china, hotelware, earthenware and porcelain by altering the thermal expansion of the glass to match that of the substrate. For the low-expansion hotelware and porcelain ware, the addition of a clear "soft" glassy flux may be required to boost the gloss of the blue glass with appropriately lowered CTE.

Alternatively, filler material such as fused silica or β-spodumene may be added to the glass such that the net thermal expansion of the fired mixture is similar to that of the tableware piece.

For on-glaze enamel firing at 800°–850° C., the softening point (S.P.) of the glass should be in the region glass 450°–600° C., while for enamel firing at 950° C., it may be as high as 700° C. To ensure that the fired enamels do not develop stress-related cracks, the CTE's of the enamels should lie ideally in the range $7.0–9.5 \times 10^{-6}/°C$. for use on bone china and in the range $4.5–5.6 \times 10^{-6}/°C$. for use on porcelain. However, for thin enamel coatings (<10 µm), the thermal expansion mismatch with the substrate can be greater.

The glass compositions of the present invention, when fired as an on-glaze enamel on tableware, preferably develop a blue colour defined by the co-ordinates L(lightness)=30 to 80, preferably 30 to 60, C(intensity)=10 to 50, preferably 30 to 50, and H(hue)=255 to 300, preferably 270 to 300.

The glass compositions of the present invention may also be used in vitreous enamel coating compositions for application to metallic substrates, with the particular glass composition being chosen with a thermal expansion which is compatible with that of the metallic substrate.

In another embodiment of the present invention the crystallizing glasses may be thermally treated, for example, at a temperature in the range of from 750° to 950° C., and subsequently ground to the desired particle size range of from 0.5 to 500 micrometers, preferably 0.5 to 50 micrometers. The particulate pigments may be dispersed in paints, polymers, ceramic bodies or glazes to provide colour in a manner analogous to conventional pigments, the particle size of the pigment being chosen having regard to the desired application.

The present invention will be further described with reference to the following non-limiting Examples.

EXAMPLES 1 to 24

For the examples provided, glass frits were prepared by fusing together raw materials of the listed oxides in the amounts as stated in parts by weight at 1200° C., and fritting the glasses so-produced by pouring into water. Following fritting, the coarse frits were ground to give a particle size distribution of 90% less than 16 micrometers, silk-green printed and fired onto either bone china (BC) or porcelain (P), at a heating rate of 13° C. per minute to 820° C., with a dwell time of 20 minutes. All of the glasses fired to give a glossy appearance. For comparitive purposes, a commercially available enamel, 33UL19, taken from Cookson Matthey Ceramics (previously Cookson Ceramics and Minerals) unleaded Pathfinder Range of on-glaze colours for tableware decoration, was chosen. The 33UL19 blue enamel is a conventional pigmented flux based on an unleaded borosilicate flux and a cobalt-containing oxide pigment.

The fired enamels were assessed in terms of colour development and acid and alkaline durability. The developed colour was assessed using an ICS Texicon Q.C. Spectrophotometer in the reflectance mode. The colour was defined in terms of the co-ordinates L(lightness), C(intensity) and H(hue). On bone china the 33UL19 colour was defined as L=43.48, C=37.90 and H=88.68, while on porcelain, 33UL19 developed a colour defined as L=47.14, C=36.16 and H=285.66.

The glasses of Examples 1 to 5 and 29 to 51 are stable glasses, whilst the glasses of Examples 6 to 28 are crystallizing glasses in which the blue colour is intensified by the formation of $(Co,Zn)_2SiO_4$ crystallites during the enamel firing cycle.

For the alkali test, the test conditions were immersion for 7 hours in a concentrated solution of a sodium phosphate—based commercial detergent held at 77° C., giving a pH=13. The acid test involved a 100 hour immersion in a 4% acetic acid solution at 25° C., giving a pH=4.

Following completion of the test, acid and alkali durabilities were evaluated by assigning a number according to the following convention:

Durability Rating

1=No visible loss of colour or gloss.

2=Some loss of gloss and possible fading of colour.

3=Gloss removed or some loss of colour.

4=Gloss removed and some loss of colour.

5=Considerable attack causing removal of colour.

For the standard 33UL19, the acid durability was rated at 2 and the alkaline durability was judged to have a rating of 3.

|  | Ex 1 | 2 | 3 | 4 |
|---|---|---|---|---|
| $SiO_2$ | 37.77 | 36.99 | 38.59 | 45.13 |
| $B_2O_3$ | 4.98 | 4.88 | 5.09 | 5.66 |
| $Al_2O_3$ | 2.40 | 2.35 | 2.46 | 2.76 |
| CoO | 7.25 | 9.17 | 5.26 | 8.29 |
| $Bi_2O_3$ | 35.58 | 34.84 | 36.34 | 19.34 |
| $Li_2O$ | 0.63 | 0.61 | 0.64 | 0.71 |
| $Na_2O$ | 0.59 | 0.58 | 0.61 | 3.69 |
| $K_2O$ | 1.85 | 1.81 | 1.89 | 3.69 |
| ZnO | 8.71 | 8.53 | 8.89 | 8.29 |
| SrO | — | — | — | — |
| $ZrO_2$ | 0.24 | 0.24 | 0.25 | 2.44 |
| Substrate | P | P | P | P |
| Colour: |  |  |  |  |
| L | 38.63 | 36.97 | 43.69 | 42.93 |
| C | 43.09 | 32.33 | 41.97 | 43.14 |
| H | 282.81 | 279.88 | 279.05 | 276.48 |
| Acid Durability | 3 | 3 | 3 | 2 |
| Alkaline Durability | 4 | 5 | 5 | 3 |
| CTE ($\times 10^{-6}$/°C.) | 8.43 | 7.47 | 7.43 | 8.46 |
| S.P. (°C.) | 590 | 580 | 590 | 570 |

|  | Ex 5 | 6 | 7 | 8 | 9 | 10 | 11 | 12 | 13 | 14 |
|---|---|---|---|---|---|---|---|---|---|---|
| $SiO_2$ | 36.28 | 53.78 | 49.05 | 39.02 | 59.18 | 45.13 | 35.02 | 45.00 | 56.71 | 36.36 |
| $B_2O_3$ | 5.83 | 6.74 | 5.55 | 10.62 | 7.42 | 5.66 | 4.62 | 6.48 | 7.11 | 6.61 |
| $Al_2O_3$ | 2.84 | 3.30 | 2.71 | 3.90 | 3.62 | 2.76 | 2.23 | 9.87 | 3.47 | 2.31 |

-continued

|  |  |  |  |  |  |  |  |  |  |
|---|---|---|---|---|---|---|---|---|---|
| CoO | 8.55 | 7.55 | 8.13 | 8.29 | 10.87 | 8.29 | 8.67 | 11.07 | 2.45 | 6.98 |
| $Bi_2O_3$ | 30.17 | 11.50 | 18.98 | 19.35 | — | 19.35 | 32.98 | 11.07 | 12.14 | 34.24 |
| $Li_2O$ | 0.73 | — | — | 0.71 | — | 0.71 | 0.58 | — | — | — |
| $Na_2O$ | 2.51 | 4.39 | 3.62 | 3.69 | 4.83 | 3.69 | 0.55 | 4.22 | 4.63 | — |
| $K_2O$ | — | — | — | 3.69 | — | 3.69 | 1.71 | — | — | 1.78 |
| ZnO | 10.56 | 9.88 | 8.13 | 8.29 | 10.87 | 8.30 | 8.07 | 9.50 | 10.42 | 8.38 |
| MgO | — | — | — | — | — | — | — | — | — | 2.07 |
| $ZrO_2$ | 2.51 | 2.90 | 3.83 | 2.44 | 3.20 | 2.44 | 5.51 | 2.79 | 3.06 | 2.48 |
| $La_2O_3$ | — | — | — | — | — | — | — | — | — | — |
| $P_2O_5$ | — | — | — | — | — | — | — | — | — | — |
| $TiO_2$ | — | — | — | — | — | — | — | — | — | — |
| $SrO_2$ | — | — | — | — | — | — | — | — | — | — |
| Substrate Colour: | P | BC | BC | BC | BC | BC | P | BC | BC | — |
| L | 39.49 | 53.76 | 47.52 | 43.13 | 40.71 | 49.44 | 44.75 | — | 76.42 | — |
| C | 33.95 | 33.32 | 32.61 | 35.85 | 52.17 | 37.88 | 33.50 | — | 10.98 | — |
| H | 269.13 | 268.54 | 279.96 | 276.55 | 272.17 | 278.04 | 259.94 | — | 259.94 | — |
| Acid Durability | 4 | — | 4 | — | 1 | 3 | 4 | — | — | — |
| Alkaline Durability | 3 | 2 | 1 | ⅔ | 1 | 2 | 2 | — | — | — |

|  | Ex 15 | 16 | 17 | 18 | 19 | 20 | 21 | 22 |
|---|---|---|---|---|---|---|---|---|
| $SiO_2$ | 37.27 | 38.25 | 51.16 | 44.26 | 43.02 | 46.72 | 44.69 | 43.84 |
| $B_2O_3$ | 6.78 | 5.04 | 6.82 | 5.55 | 5.39 | 5.86 | 5.60 | 5.50 |
| $Al_2O_3$ | 2.37 | 2.43 | 4.54 | 2.71 | 2.63 | 2.86 | 2.73 | 2.68 |
| CoO | 7.16 | 5.22 | 9.09 | 8.13 | 7.90 | 8.59 | 8.21 | 8.06 |
| $Bi_2O_3$ | 35.10 | 36.03 | 11.36 | 18.97 | 18.44 | 20.03 | 19.16 | 18.79 |
| $Li_2O$ | 0.62 | 0.63 | 2.27 | 0.70 | 0.68 | — | 0.71 | 0.69 |
| $Na_2O$ | — | 0.60 | — | 3.62 | 3.52 | 3.82 | 3.65 | 3.58 |
| $K_2O$ | 1.82 | 1.87 | — | 3.62 | 3.52 | — | 3.65 | 3.58 |
| ZnO | 8.59 | 8.82 | 11.36 | 8.13 | 7.91 | 8.59 | 8.21 | 8.06 |
| MgO | — | — | — | — | — | — | — | — |
| ZrO | 0.24 | 0.24 | 3.41 | 2.39 | 2.33 | 2.53 | 2.42 | 2.37 |
| $La_2O_3$ | — | — | — | 1.91 | — | — | — | — |
| $P_2O_5$ | — | — | — | — | 4.65 | — | 0.97 | 2.84 |
| $TiO_2$ | — | 0.87 | — | — | — | — | — | — |
| $SnO_2$ | — | — | — | — | — | 1.0 | — | — |
| Substrate Colour: | BC | BC | BC | BC | BC | BC | BC | BC |
| L | 46.58 | 45.64 | 51.05 | 62.77 | — | 44.53 | — | — |
| C | 40.32 | 41.15 | 23.77 | 13.19 | — | 29.64 | — | — |
| H | 278.42 | 281.17 | 266.06 | 276.98 | — | 270.41 | — | — |
| Acid Durability | 2 | 2 | — | — | — | 5 | — | — |
| Alkaline Durability | 2 | 2 | 1 | — | — | 3 | — | — |

The coefficients of thermal expansion of certain of the glass compositions tabulated above are given below:

| Example No. | CTE × $10^{-6}$/°C. |
|---|---|
| 15 | 7.19 |
| 17 | 4.92 |
| 10 | 7.32 |
| 5 | 6.58 |
| 16 | 6.38 |

EXAMPLES 23 and 24

The glasses of the compositions of Examples 10 and 12, in powder form having a particle size of 90% less than 14 micrometers were heated separately at 13° C./minutes to 850° C., held at this temperature for 10 minutes and cooled down to room temperature at 13° C./min. The resulting fused materials were pulverised and passed through a 100 micrometer sieve. The intensity of the blue colour was increased in each case by the thermal treatment, with X-ray diffraction analysis confirming the presence of (Co,Zn)$_2$SiO$_4$ in each case.

We claim:

1. An article which is decorated with a glass composition which contains a crystalline $(Co,Zn)_2SiO_4$ phase, which is essentially free from lead and cadmium and which consists essentially of the following components:

|  | Weight percent |  |
|---|---|---|
| $SiO_2$ | 30–70 | |
| $B_2O_3$ | 1–25 | |
| $Al_2O_3$ | 0–10 | |
| $Bi_2O_3$ | 0–50 | |
| CoO | 5–15 | |
| At least one of |  | |
| $Li_2O$ | 0–10 | |
| $Na_2O$ | 0–20 | 1–30 (in total) |
| $K_2O$ | 0–20 | |
| optionally one or more of MgO, CaO, SrO or BaO | | |
|  | 0–15 | |
| ZnO | 5–20 | |
| $ZrO_2$ | up to 10 | |
| $TiO_2$ | 0–1 | |
| optionally one or more of $SnO_2$, $WO_3$, $MoO_3$ or $Nb_2O_5$ | | |

| | Weight percent |
|---|---|
| | 0–5 |
| optionally one or more of $Y_2O_3$, $La_2O_3$ or $CeO_2$ | |
| | 0–5 |
| $P_2O_5$ | 0–5. |

2. An article which is decorated with a fired printing ink or printing paste composition which comprises a glass composition which contains a crystalline $(Co,Zn)_2SiO_4$ phase, which is essentially free from lead and cadmium and which consists essentially of the following components:

| | Weight Percent | |
|---|---|---|
| $SiO_2$ | 30–70 | |
| $B_2O_3$ | 1–25 | |
| $Al_2O_3$ | 0–10 | |
| $Bi_2O_3$ | 0–50 | |
| CoO | 5–15 | |
| At least one of | | |
| $Li_2O$ | 0–10 | |
| $Na_2O$ | 0–20 | 1–30 (in total) |
| $K_2O$ | 0–20 | |
| optionally one or more of MgO, CaO, SrO or BaO | 0–15 | |
| ZnO | 5–20 | |
| $ZrO_2$ | up to 10 | |
| $TiO_2$ | 0–1 | |
| optionally one or more of $SnO_2$, $WO_3$, $MoO_3$ or $Nb_2O_5$ | 0–5 | |
| optionally one or more of $Y_2O_3$, $La_2O_3$ or $CeO_2$ | 0–5 | |
| $P_2O_5$ | 0–5, | | said composition being dispersed in an oil-, water-, solvent- or wax-containing medium.

3. A pigment composition which comprises particles of a glass composition which contains a crystalline $(Co,Zn)_2SiO_4$ phase, which is essentially free from lead and cadmium and which consists essentially of the following components:

| | Weight Percent | |
|---|---|---|
| $SiO_2$ | 30–70 | |
| $B_2O_3$ | 1–25 | |
| $Al_2O_3$ | 0–10 | |
| $Bi_2O_3$ | 0–50 | |
| CoO | 5–15 | |
| At least one of | | |
| $Li_2O$ | 0–10 | |
| $Na_2O$ | 0–20 | 1–30 (in total) |
| $K_2O$ | 0–20 | |
| optionally one or more of MgO, CaO, SrO or BaO | 0–15 | |
| ZnO | 5–20 | |
| $ZrO_2$ | up to 10 | |
| $TiO_2$ | 0–1 | |
| optionally one or more of $SnO_2$, $WO_3$, $MoO_3$ or $Nb_2O_5$ | 0–5 | |
| optionally one or more of $Y_2O_3$, $La_2O_3$ or $CeO_2$ | 0–5 | |
| $P_2O_5$ | 0–5, | | having a particle size in the range of from 0.5 to 500 micrometers.

4. A pigment composition as claimed in claim 3 which has a particle size in the range of from 0.5 to 50 micrometers.

5. A product which has a pigment composition which comprises particles of a glass composition which contains a crystalline $(Co,Zn)_2SiO_4$ phase, which is essentially free from lead and cadmium and which consists essentially of the following components:

| | Weight Percent | |
|---|---|---|
| $SiO_2$ | 30–70 | |
| $B_2O_3$ | 1–25 | |
| $Al_2O_3$ | 0–10 | |
| $Bi_2O_3$ | 0–50 | |
| CoO | 5–15 | |
| At least one of | | |
| $Li_2O$ | 0–10 | |
| $Na_2O$ | 0–20 | 1–30 (in total) |
| $K_2O$ | 0–20 | |
| optionally one or more of MgO, CaO, SrO or BaO | 0–15 | |
| ZnO | 5–20 | |
| $ZrO_2$ | up to 10 | |
| $TiO_2$ | 0–1 | |
| optionally one or more of $SnO_2$, $WO_3$, $MoO_3$ or $Nb_2O_5$ | 0–5 | |
| optionally one or more of $Y_2O_3$, $La_2O_3$ or $CeO_2$ | 0–5 | |
| $P_2O_5$ | 0–5, | | having a particle size in the range of from 0.5 to 500 micrometers dispersed therein or therethrough.

6. A product as claimed in claim 5, which consists of a paint.

7. A product as claimed in claim 5, which consists of a polymer material.

8. A product as claimed in claim 5, which consists of a ceramic body.

9. A product as claimed in claim 5, which consists of a glaze.

* * * * *